United States Patent
Yang et al.

(10) Patent No.: US 11,391,560 B2
(45) Date of Patent: Jul. 19, 2022

(54) IMAGE ACQUISITION DEVICE AND MEASURING METHOD FOR GEOMETRIC PARAMETERS OF SPECIFIC DEVELOPING AREA ON CONCRETE TEST BLOCKS

(71) Applicant: GUANGXI UNIVERSITY, Guangxi (CN)

(72) Inventors: Lufeng Yang, Guangxi (CN); Junwu Chen, Guangxi (CN); Hao Kang, Guangxi (CN); Xiani Liang, Guangxi (CN); Zheng Chen, Guangxi (CN); Jiaqi Zhao, Guangxi (CN); Weizhe Sun, Guangxi (CN); Wenting Nong, Guangxi (CN); Weifu Lu, Guangxi (CN); Linyu Gan, Guangxi (CN)

(73) Assignee: GUANGXI UNIVERSITY, Nanning (CN)

( * ) Notice: Subject to any disclaimer, the term of this patent is extended or adjusted under 35 U.S.C. 154(b) by 259 days.

(21) Appl. No.: 16/869,547

(22) Filed: May 7, 2020

(65) Prior Publication Data

US 2020/0355490 A1    Nov. 12, 2020

(30) Foreign Application Priority Data

May 8, 2019    (CN) .......................... 201910381161.2

(51) Int. Cl.
*G06K 9/00*    (2022.01)
*G01B 11/02*    (2006.01)
(Continued)

(52) U.S. Cl.
CPC .......... *G01B 11/022* (2013.01); *G01B 11/285* (2013.01); *G06T 7/62* (2017.01);
(Continued)

(58) Field of Classification Search
CPC ..... G01B 11/022; G01B 11/285; G01B 11/02; G01B 11/08; G01B 11/00; G01B 11/22;
(Continued)

(56) References Cited

U.S. PATENT DOCUMENTS 9,387,533 B1 * 7/2016 Heneveld ............... G03B 37/02
396/20
2003/0227632 A1 * 12/2003 Marcus .............. G01B 9/02007
356/497
(Continued)

FOREIGN PATENT DOCUMENTS

CA    3036691 A1 *  3/2018    ............ C12M 23/04
CN    101718671 A  *  6/2010
(Continued)

OTHER PUBLICATIONS

Xu G, et al., Carbonation Depth Measurement Based on Digital Image Processing Technique, Hydro-Science and Engineering, 2013, 3, 21-24.
Chen Zheng, Yang Lu-feng, Feng Qing-ge, Image processing method for the area measure of paste and aggregate on concrete section.

*Primary Examiner* — Mahendra R Patel

(57) ABSTRACT

An image acquisition device and a measuring method for geometric parameters of a specific developing area on a concrete test block. In the image acquisition device, a digital camera is provided on a camera support; the camera support is provided with a screw bearing which is connected to a first stepping motor via a first coupling; the camera support is provided on a screw slideway which is connected to a second stepping motor via a second coupling; the screw slideway, the first stepping motor and the second stepping motor are provided on a rear platform of a L-shaped base; a spirit level and a controller are respectively provided at two
(Continued)

sides of the rear platform of the L-shaped base; and a reference glass plate is arranged on a front raised platform of the L-shaped base.

6 Claims, 4 Drawing Sheets

(51) Int. Cl.
*G06T 7/62* (2017.01)
*H04N 5/232* (2006.01)
*G01B 11/28* (2006.01)
*H04N 5/225* (2006.01)

(52) U.S. Cl.
CPC ....... *H04N 5/2253* (2013.01); *H04N 5/23299* (2018.08); *G06T 2207/30132* (2013.01); *G06T 2207/30204* (2013.01)

(58) Field of Classification Search
CPC ............. G06T 7/62; G06T 2207/30132; G06T 2207/30204; H04N 5/2253; H04N 5/23299; H04N 5/2257; H04N 5/232; G03B 17/561
USPC ......................................................... 382/141
See application file for complete search history.

(56) References Cited

U.S. PATENT DOCUMENTS

| | | | | |
|---|---|---|---|---|
| 2007/0014551 A1* | 1/2007 | Fujisawa | ................ | G03B 37/02 396/20 |
| 2008/0027590 A1* | 1/2008 | Phillips | ................ | G05D 1/0088 701/2 |
| 2017/0270690 A1* | 9/2017 | Chung | ................ | G05D 1/0088 701/2 |

FOREIGN PATENT DOCUMENTS

| | | | | | |
|---|---|---|---|---|---|
| CN | 102564916 | A | * | 7/2012 | |
| CN | 203275253 | U | * | 11/2013 | ............. C09K 21/02 |
| CN | 103954557 | A | * | 7/2014 | ............. C09K 21/02 |
| CN | 105387804 | A | * | 3/2016 | ............. G01B 11/00 |
| CN | 103954557 | B | * | 4/2016 | ............. C09K 21/02 |
| CN | 103954557 | B | | 4/2016 | |
| CN | 106066286 | A | * | 11/2016 | ............. C09K 21/02 |
| CN | 108214219 | A | * | 6/2018 | ............. C09K 21/02 |
| CN | 207993036 | U | * | 10/2018 | ............. C09K 21/02 |
| CN | 207993036 | U | | 10/2018 | |
| CN | 109883927 | A | * | 6/2019 | ............. C09K 21/02 |
| CN | 209198374 | U | * | 8/2019 | ............. C09K 21/02 |
| KR | 101695649 | B1 | * | 12/2015 | ............. C09K 21/02 |
| WO | WO-2017074190 | A1 | * | 5/2017 | ............. C09K 21/02 |

* cited by examiner

IMAGE ACQUISITION DEVICE AND MEASURING METHOD FOR GEOMETRIC PARAMETERS OF SPECIFIC DEVELOPING AREA ON CONCRETE TEST BLOCKS

CROSS-REFERENCE TO RELATED APPLICATIONS

This application claims the benefit of priority from Chinese Patent Application No. 201910381161.2, filed on May 8, 2019. The content of the aforementioned application, including any intervening amendments thereto, is incorporated herein by reference in its entirety.

TECHNICAL FIELD

This application relates to concrete research, and more particularly to an image acquisition device and a measuring method for geometric parameters of a specific developing area on a concrete test block.

BACKGROUND OF THE INVENTION

In a concrete Rapid Chloride Migration (RCM) test, it is required to measure a depth of a specific area displaying white on a section of a semi-cylindric concrete test block, while in a concrete carbonation test, it is required to measure a depth of a specific area not displaying red on a cross section of a cube or cuboid concrete test block. Traditionally, multiple measuring points are evenly arranged along a sectional bottom edge of a concrete test block, and then depths of the specific developing areas on individual measuring points are manually measured by a caliper and averaged to be used as the depth of the specific developing area. However, the measuring results are relative to the distribution sparsity of the measuring points, and the manual measurement is prone to the effect of subjective behavior of the measurer, causing some errors and affecting the measuring accuracy. With the development of computer science and technology, it is preferable to use computer softwares and image processing techniques to measure geometric parameters of a specific developing area with on a concrete test block, overcoming defects in the conventional manual measurements. It has been reported on the use of an image processing technique to analyze the distribution of aggregate and paste on a concrete section (Chen Z, et al., Image Processing Method for Area Measurement of Paste and Aggregate on Concrete Section, *Concrete*, 2012, 269(3), 25-27). Chinses Patent Application No. 201410202959.3 discloses an image analysis method for comprehensive assessment of rate coefficient of concrete carbonation, which obtains developing images by adjusting levels to calculate the carbonation depth of concrete test blocks. However, the two above-mentioned methods both have the following defects, for example, (1) when geometric parameters of a specific developing area on the concrete test block are calculated according to a proportional relation of the image pixel and geometric parameters of a reference using a preset size (150 mm×150 mm×150 mm) of the concrete test block as the reference, there is no reference which is independent of the concrete test block and can be used for proportion conversion, resulting in loss in the calculation accuracy because of an error between the actual and preset sizes of the reference; (2) these methods both use handheld digital cameras instead of image collecting devices to shoot the concrete section, making it hard to keep the cameras stable in position, ensure the axis of camera lens to be perpendicular to the concrete section and keep a constant optimal shooting distance between the lens and the concrete section, which results in insufficient image pixels and affects the accuracy of the image processing results.

It has been reported that a scanner is used to obtain carbonized section images by scanning a concrete test block in a scanning container (Xu G, et al., Carbonation Depth Measurement Based on Digital Image Processing Technique, *Hydro-Science and Engineering*, 2013, 3, 21-24). This method is applicable to the acquisition of images of areas displaying obvious difference in color. However, in this literature, the bottom surface of a concrete test block is required to be smooth, and there is no method for obtaining a geometric parameter of the carbonized area. Chinese Patent Application No. 201820471379.8 discloses an image acquisition device, which obtain images by placing a target on a horizontal plane steadily and shooting an upper plane of the target. However, due to lack of facilities for steadily placing arc cylinders, neither of the two above-mentioned devices is applicable to the shooting of an axial section of a semi-cylindric test block. Moreover, neither of the two above-mentioned documents provides a method for measuring a geometric parameter of a specific developing area on a concrete test block.

During the image processing for sectional images of a concrete test block, the image quality sensed by an imaging device directly affects the accuracy of the processing results, and the image processing method also affects the efficiency and precision of the image processing. Therefore, it is necessary to provide an imaging device with high sensing accuracy and an image acquisition method for an area with specific coloration on a concrete test block to accurately measure a geometric parameter of a specific developing area on the concrete test block.

SUMMARY OF THE INVENTION

An object of the invention is to provide an image acquisition device and a measuring method for geometric parameters of a specific developing area on a concrete test block to overcome the defects in the prior art, where digital images are obtained via an electronic operating platform. The invention is applicable to the imaging of sections of cube, cuboid and semi-cylindric concrete test blocks, and can accurately measure and calculate the geometric parameters of the specific developing area on the concrete test block using an imaging processing technique.

The invention is achieved by adopting the following technical solutions.

The invention provides an image acquisition device for geometric parameters of a specific developing area on a concrete test block, comprising:

a digital camera;
a camera support on which the digital camera is provided;
a screw slideway on which the camera support is provided;
a screw bearing provided on the camera support;
a first stepping motor;
a first coupling through which the screw bearing is connected to the first stepping motor;
a second stepping motor;
a second coupling through which the screw slideway is connected to the second stepping motor;
a L-shaped base;
a spirit level;
a controller; and
a reference glass plate;

wherein the screw slideway, the first stepping motor and the second stepping motor are provided on a rear platform of the L-shaped base; the spirit level and the controller are provided at two sides of the rear platform of the L-shaped base, respectively; and the reference glass plate is arranged on a front raised platform of the L-shaped base;

the controller is provided with an "up" button, a "down" button, a "forward" button and a "backward" button; wherein the "up" and "down" buttons are connected to the first stepping motor via a first cable to drive the camera support to move up and down, respectively; and the "forward" and "backward" buttons are connected to the second stepping motor via a second cable to drive the camera support to move forward and backward, respectively.

The reference glass plate is a rectangular transparent glass plate having a marker.

The marker is a yellow semitransparent square having a side length $L_0$ of 10 mm and an area $S_0$ of 100 mm$^2$, and is firmly painted on the reference glass plate; and a vertical ruler is provided close to a left side of the marker.

The front raised platform of the L-shaped base is provided with a slot for arranging the reference glass plate; the rear platform of the L-shaped base is provided with a horizontal scale beside the screw slideway; a plane of the front raised platform and a plane of the rear platform are parallel to each other; and four supports having adjustable height are provided below the L-shaped base.

A table top of the camera support is parallel to a table top of the rear platform of the L-shaped base; the table top of the camera support is adjustable in height via the "up" and "down" buttons; a laser designator is provided at a side of the camera support and determines whether a lens of the digital camera is located at the same horizontal plane as a cross section of the concrete test block.

The invention further provides a method for measuring the geometric parameters of the specific developing area on the concrete test block using the image acquisition device, comprising:

(1) according to the spirit level, adjusting heights of the four supports to keep the table top of the rear platform of the L-shaped base horizontal;

(2) placing a bottom of the concrete test block on a front end of the reference glass plate to allow an axial section of the concrete test block to be parallel to the reference glass plate and to abut on the reference glass plate;

(3) mounting the digital camera on the camera support horizontally; according to the laser designator, pressing the "up" button or the "down" button on the controller to drive the camera support to move up or down to keep the lens of the digital camera being located at the same horizontal plane as the section of the concrete test block; referring to the horizontal scale beside the screw slideway, pressing the "forward" button or the "backward" button on the controller to drive the camera support to move forward or backward to keep a distance between the digital camera and the section of the concrete test block being 50 to 150 times the focal length of the lens, allowing the digital camera to collect clear images of the section of the concrete test block;

(4) collecting images of the concrete test block and the marker on the reference glass plate using the digital camera to shoot the section;

(5) opening the images shot by the digital camera using an image processing software and selecting the specific developing area and an area of the marker to respectively read pixels of geometric parameters thereof; and (6) calculating the geometric parameters of the specific developing area on the concrete test block according to a relationship among the pixels of the geometric parameters of the area of the marker and the specific developing area in the images and actual geometric parameters of the marker;

wherein among the geometric parameters of the specific developing area on the concrete test block, width R (mm) is calculated according to the following equation:

$$R = \frac{P_2}{P_1} \times L_0;$$

wherein $P_1$ indicates a pixel of a side length of the area of the marker in the images; $P_2$ indicates a pixel of a width of the specific developing area in the images; and $L_0$ indicates an actual side length of the marker;

area S (mm$^2$) of the specific developing area is calculated according to the following equation:

$$S = \frac{P_4}{P_3} \times S_0;$$

wherein $P_3$ indicates a pixel of an area of the marker in the images; $P_4$ indicates a pixel of an area of the specific developing area; and $S_0$ indicates an actual area of the marker.

Compared to the prior art, the invention has the following beneficial effects.

The image acquisition device provided herein can keep the lens of the digital camera being located at the same horizontal plane as the section of the concrete test block by controlling the height and front and back position of the camera support, and can ensure that the section of the concrete test block is clearly imaged by the digital camera.

The method provided herein can rapidly and accurately calculate the geometric parameters of the specific developing area on the concrete test block according to the relationship among the pixels and the actual geometric parameters of the marker.

The image acquisition device and the method are applicable to the measurement of cube, rectangle and semicylindric concrete test blocks and can measure geometric parameters, such as length and area, of the specific developing area.

Figure 1:
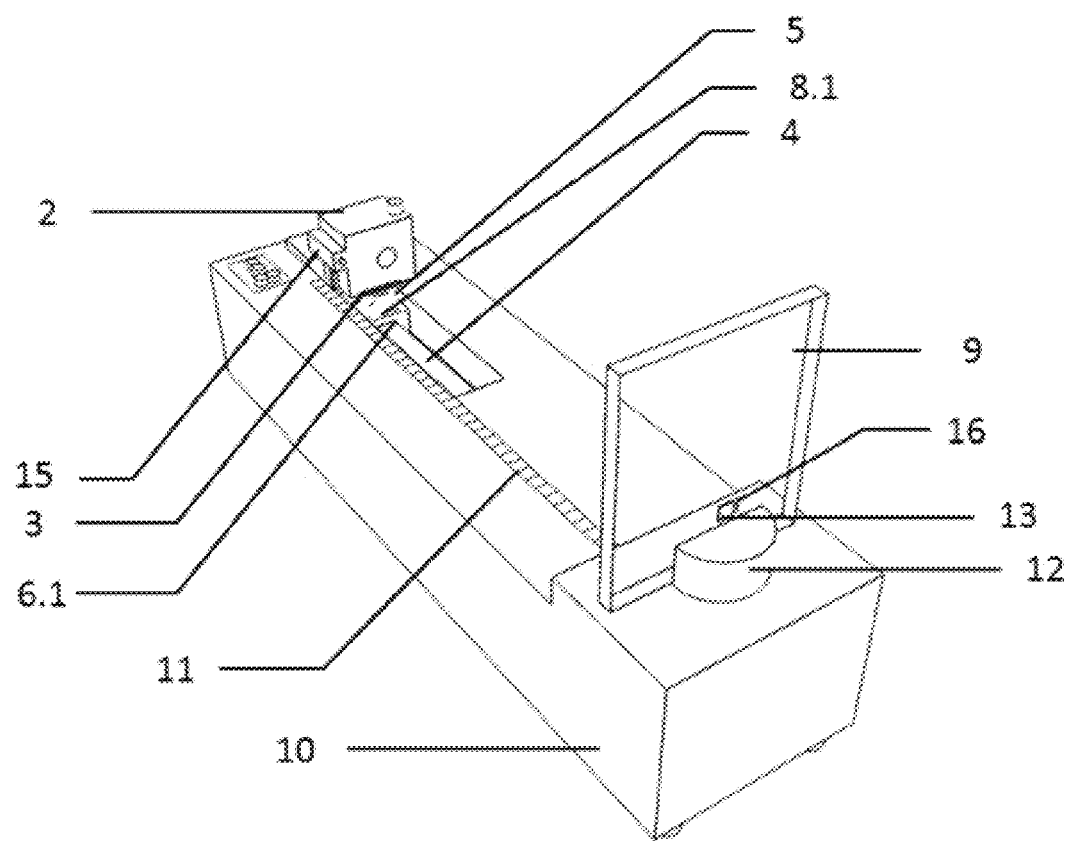
FIG. 1 is a schematic diagram of an image acquisition device for geometric parameters of a specific developing area on a concrete test block according to the present invention.
Figure 2:
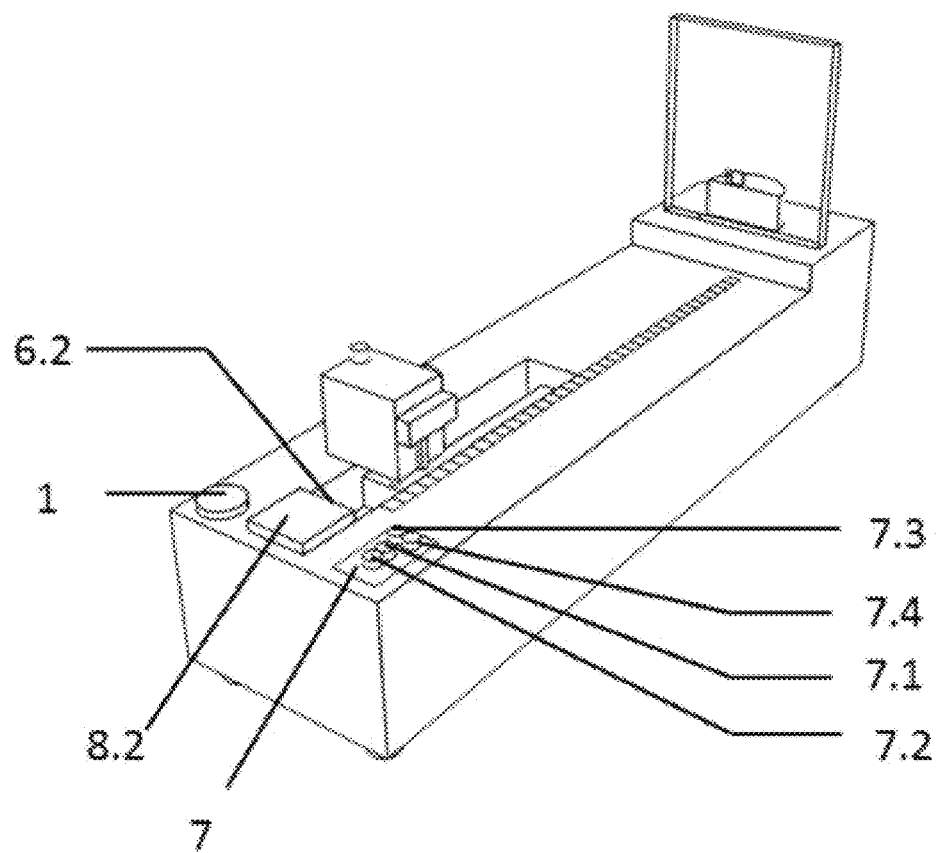
FIG. 2 is a schematic diagram of the image acquisition device from another view according to the present invention.
Figure 3:
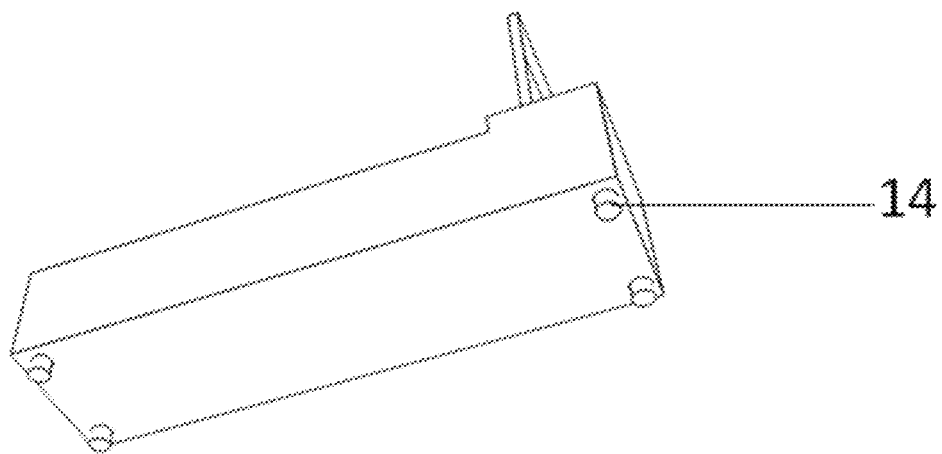
FIG. 3 is a bottom view of the image acquisition device according to the present invention.
Figure 4:
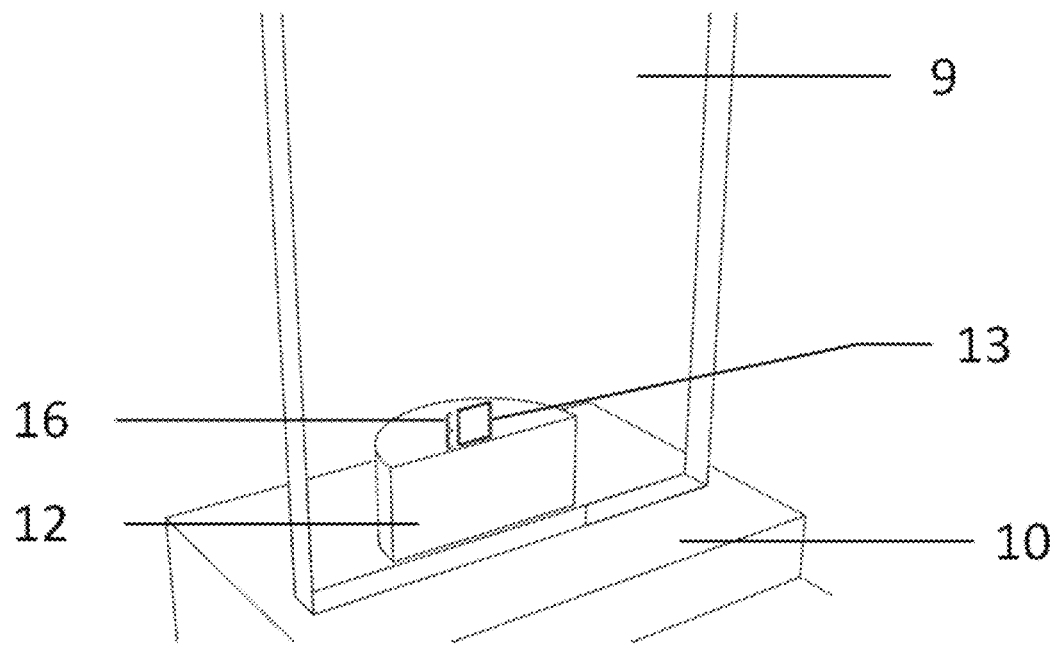
FIG. 4 is an enlarged partial view of the image acquisition device according to the present invention.
Figure 5:
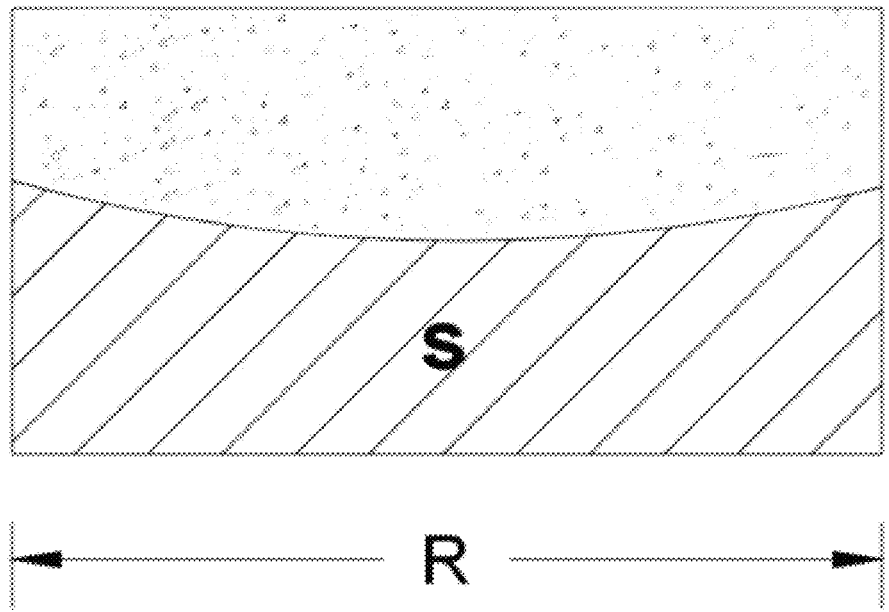
FIG. 5 schematically shows the specific developing area on the concrete test block according to the present invention.
Figure 6:
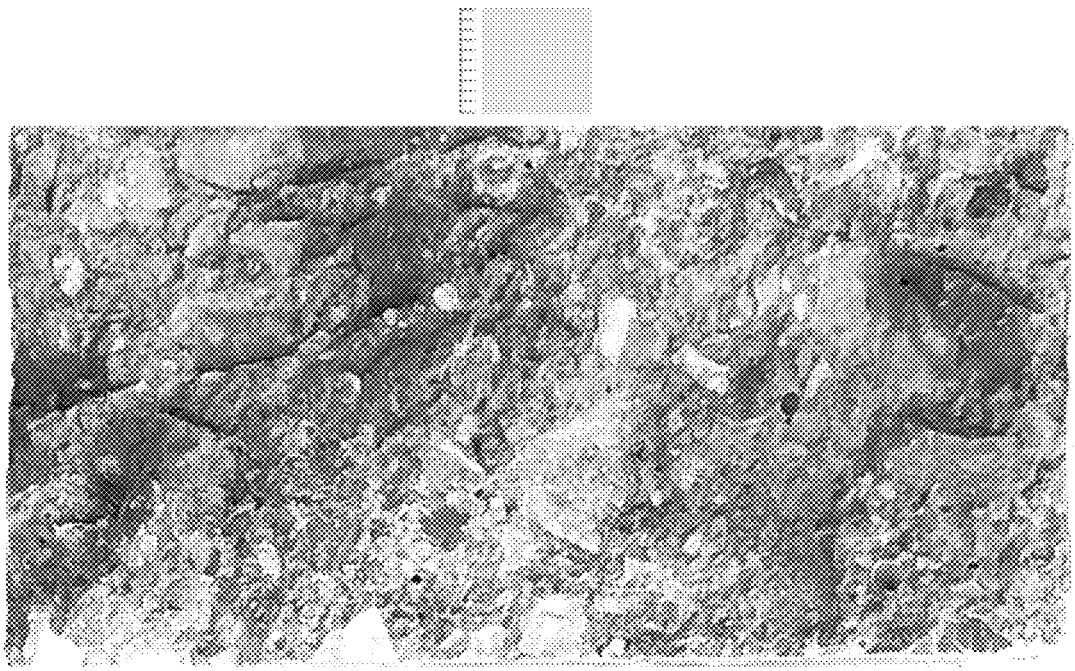
FIG. 6 schematically shows digital images of a section of the concrete test block and a marker before treated by a method for measuring the geometric parameters of the specific developing area on the concrete test block according to the present invention.
Figure 7:
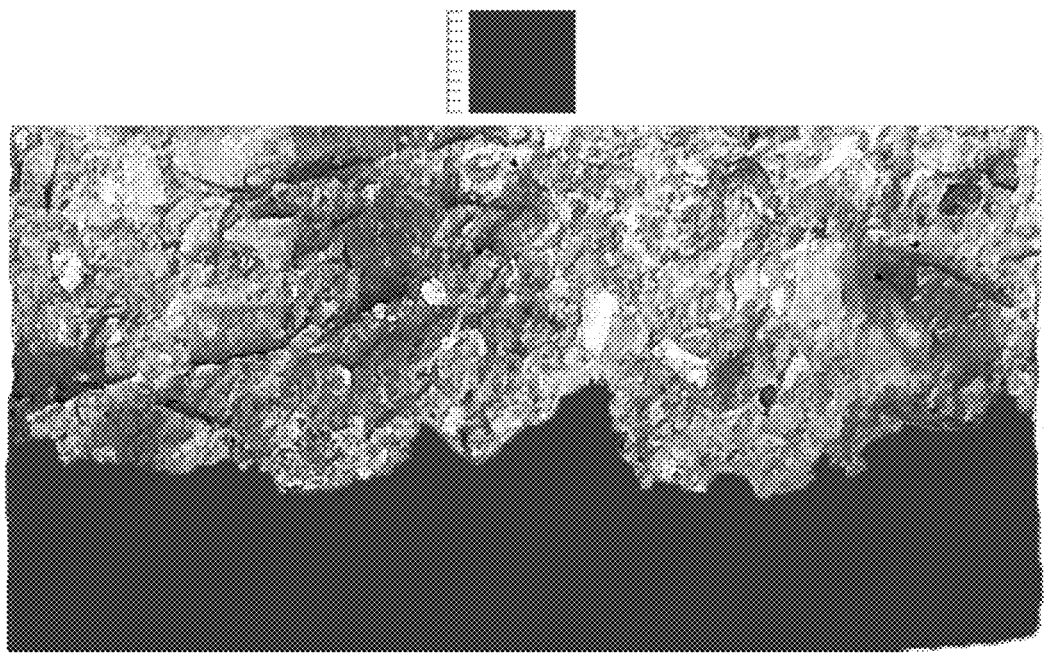
FIG. 7 schematically shows digital images of the section of the concrete test block and the marker after treated by the measuring method according to the present invention.

In the drawings, spirit level—1, digital camera—2, camera support—3, screw slideway—4, screw bearing—5, first coupling—6.1, second coupling—6.2, controller—7, first stepping motor—8.1, second stepping motor—8.2, reference glass plate—9, L-shaped base—10, horizontal scale—11, concrete test block—12, marker—13, support—14, laser designator—15, vertical ruler—16.

DETAILED DESCRIPTION OF EMBODIMENTS

The invention will be described in detail below with reference to the accompanying drawings and embodiments to make the technical solutions better understood.

As shown in FIG. 1, the invention provides an image acquisition device for geometric parameters of a specific developing area on a concrete test block, including: a digital camera 2; a camera support 3 on which the digital camera 2 is provided; a screw slideway 4 on which the camera support 3 is provided; a screw bearing 5 provided on the camera support 3; a first stepping motor 8.1; a first coupling 6.1 through which the screw bearing 5 is connected to the first stepping motor 8.1; a second stepping motor 8.2; a second coupling 6.2 through which the screw slideway 5 is connected to the second stepping motor 8.2; a L-shaped base 10; a spirit level 1; a controller 7; and a reference glass plate 9.

The screw slideway 4, the first stepping motor 8.1 and the second stepping motor 8.2 are provided on a rear platform of the L-shaped base 10. The spirit level 1 and the controller 7 are provided at two sides of the rear platform of the L-shaped base 10, respectively. The reference glass plate 9 is arranged on a front raised platform of the L-shaped base 10.

The controller 7 is provided with an "up" button 7.3, a "down" button 7.4, a "forward" button 7.1 and a "backward" button 7.2, where the "up" button 7.3 and "down" button 7.4 are connected to the first stepping motor 8.1 via a first cable to drive the camera support 3 to move up and down, respectively; and the "forward" button 7.1 and "backward" button 7.2 are connected to the second stepping motor 8.2 via a second cable to drive the camera support 3 to move forward and backward, respectively.

A horizontal scale 11 is engraved on the L-shaped base 10. The front raised platform of the L-shaped base 10 is provided with a concrete test block 12. A marker 13 is provided on the reference glass plate 9. A vertical ruler 16 is provided close to a left side of the marker 13. Four supports 14 having adjustable height are provided below the L-shaped base 10. A laser designator 15 is provided at a side of the camera support 3.

The invention further provides a method for measuring the geometric parameters of the specific developing area on the concrete test block using the above image acquisition device, which is exemplarily used herein to measure a diffusion depth of chloride ions in the concrete test block after the Rapid Chloride Migration (RCM) test.

(1) According to the spirit level 1, heights of the four supports are adjusted to keep the table top of the rear platform of the L-shaped base horizontal.

(2) After the RCM test, the concrete test block 12 is split along the diameter, and a solution of silver nitrate is ejected to a section of the concrete test block 12. After 15 min, a bottom of the concrete test block 12 is placed on a front end of the reference glass plate 9 to allow an axial section of the concrete test block 12 to be parallel to the reference glass plate 9 and to abut on the reference glass plate 9.

(3) The digital camera 2 is mounted on the camera support 3 horizontally. In this embodiment, a lens of the digital camera 2 has a focal length of 6 mm. Referring to the horizontal scale 11 beside the screw slideway 4, the "forward" button 7.1 or "backward" button 7.2 on the controller 7 is pressed to drive the camera support 3 to move forward or backward to keep a distance between the digital camera 2 and the section of the concrete test block 12 of 30 cm, i.e. 50 times the focal length of the lens. According to the height projected on the reference glass plate 9 by the laser designator 15, the "up" button 7.3 or "down" button 7.4 on the controller 7 is pressed to drive the camera support 3 to move up or down to keep the lens of the digital camera 2 located at the same horizontal plane as the section of the concrete test block 12.

(4) Images of the concrete test block 12 and the marker 13 on the reference glass plate 9 are collected using the digital camera 2 to shot the section, and the images are opened by Adobe Photoshop CS6 (PS for short).

(5) A diffusion area of chloride ions is selected by the "Quick Selection Tool" of PS and set as Layer 1 using the keyboard shortcut "Ctrl+Shift+N". The keyboard shortcut "Ctrl+Delete" is used to fill a background of the diffusion area of chloride ions in red. The "histogram" window is opened, the "source" is set as "selected layer", and a pixel $P_4$ is read as 33677. An area of the marker 13 is selected by the "Rectangle Selection Tool" of PS and set as Layer 2 using the keyboard shortcut "Ctrl+Shift+N". The keyboard shortcut "Ctrl+Delete" is used to fill the area of the marker 13 in red. The "histogram" window is opened, the "source" is set as "selected layer", and a pixel $P_3$ is read as 1722.

(6) According to a relationship among the pixels of the geometric parameters of the area of the marker 13 and the specific developing area in the images and actual geometric parameters of the marker 13, the geometric parameters of the specific developing area on the concrete test block 12 is calculated.

Among the geometric parameters of the diffusion area of chloride ions on the concrete test block 12, diameter R (mm) of the concrete test block 12 is calculated according to the following equation:

$$R = \frac{P_2}{P_1} \times L_0 = \frac{28.97}{2.90} \times 10 = 99.9;$$

where $P_1$ indicates a pixel of a side length of the area of the marker 13 and is read using the "Ruler Tool" of PS to be 2.90; $P_2$ indicates a pixel of a diameter of the concrete test block 12 and is read using the "Ruler Tool" of PS to be 28.97; and $L_0$ indicates an actual side length of the marker and is 10;

area S (mm$^2$) of the diffusion area of chloride ions is calculated according to the following equation:

$$S = \frac{P_4}{P_3} \times S_0 = \frac{33677}{1722} \times 100 = 1956;$$

where $P_3$ indicates a pixel of an area of the marker 13; $S_0$ indicates an actual area of the marker 13; and $P_4$ indicates a pixel of an area of the diffusion area of chloride ions;

diffusion depth $x_d$ (mm) of chloride ions is calculated as follows:

$$x_d = \frac{P_4}{P_3} \times \frac{S_0}{R} = \frac{33677}{1722} \times \frac{100}{99.9} = 19.58;$$

where $P_3$ indicates the pixel of the area of the marker 13; $S_0$ indicates the actual area of the marker 13; $P_4$ indicates a pixel of an area of the diffusion area of chloride ions; and R indicates the diameter of the concrete test block 12.

What is claimed is:

1. An image acquisition device for geometric parameters of a specific developing area on a concrete test block, comprising:
   a digital camera;
   a camera support on which the digital camera is provided;
   a screw slideway on which the camera support is provided;
   a screw bearing provided on the camera support;
   a first stepping motor;
   a first coupling through which the screw bearing is connected to the first stepping motor;
   a second stepping motor;
   a second coupling through which the screw slideway is connected to the second stepping motor;
   a L-shaped base;
   a spirit level;
   a controller; and
   a reference glass plate;
   wherein the screw slideway, the first stepping motor and the second stepping motor are provided on a rear platform of the L-shaped base; the spirit level and the controller are respectively provided at two sides of the rear platform of the L-shaped base; and the reference glass plate is arranged on a front raised platform of the L-shaped base;
   the controller is provided with an "up" button, a "down" button, a "forward" button and a "backward" button; wherein the "up" and "down" buttons are connected to the first stepping motor via a first cable to drive the camera support to move up and down, respectively; and the "forward" and "backward" buttons are connected to the second stepping motor via a second cable to drive the camera support to move forward and backward, respectively.

2. The image acquisition device of claim 1, wherein the reference glass plate is a rectangular transparent glass plate having a marker.

3. The image acquisition device of claim 2, wherein the marker is a yellow semitransparent square having a side length $L_0$ of 10 m and an area $S_0$ of 100 mm², and is firmly painted on the reference glass plate; and a vertical ruler is provided close to a left side of the marker.

4. The image acquisition device of claim 1, wherein the front raised platform of the L-shaped base is provided with a slot for arranging the reference glass plate; the rear platform of the L-shaped base is provided with a horizontal scale beside the screw slideway; a plane of the front raised platform and a plane of the rear platform are parallel to each other; and four supports having adjustable height are provided below the L-shaped base.

5. The image acquisition device of claim 1, wherein a table top of the camera support is parallel to a table top of the rear platform of the L-shaped base; the table top of the camera support is adjustable in height via the "up" and "down" buttons; a laser designator is provided at a side of the camera support and determines whether a lens of the digital camera is located at the same horizontal plane as a cross section of the concrete test block.

6. A method for measuring the geometric parameters of the specific developing area on the concrete test block using the image acquisition device of claim 1, comprising:
   (1) according to the spirit level, adjusting heights of four supports to keep a table top of the rear platform of the L-shaped base horizontal;
   (2) placing a bottom of the concrete test block on a front end of the reference glass plate to allow an axial section of the concrete test block to be parallel to the reference glass plate and to abut on the reference glass plate;
   (3) mounting the digital camera on the camera support horizontally; according to the laser designator, pressing the "up" button or the "down" button on the controller to drive the camera support to move up or down to keep the lens of the digital camera being located at the same horizontal plane as the section of the concrete test block; referring to the horizontal scale beside the screw slideway, pressing the "forward" button or the "backward" button on the controller to drive the camera support to move forward or backward to keep a distance between the digital camera and the section of the concrete test block being 50 to 150 times the focal length of the lens, allowing the digital camera to collect clear images of the section of the concrete test block;
   (4) collecting images of the concrete test block and the marker on the reference glass plate using the digital camera to shoot the section;
   (5) opening the images shot by the digital camera using an image processing software and selecting the specific developing area and an area of the marker to respectively read pixels of geometric parameters thereof; and
   (6) calculating the geometric parameters of the specific developing area on the concrete test block according to a relationship among the pixels of the geometric parameters of the area of the marker and the specific developing area in the images and actual geometric parameters of the marker;
   wherein among the geometric parameters of the specific developing area on the concrete test block, width R (mm) is calculated according to the following equation:

$$R = \frac{P_2}{P_1} \times L_0;$$

wherein $P_1$ indicates a pixel of a side length of the area of the marker in the images; $P_2$ indicates a pixel of a width of the specific developing area in the images; and $L_0$ indicates an actual side length of the marker;
area S (mm²) of the specific developing area is calculated according to the following equation:

$$S = \frac{P_4}{P_3} \times S_0;$$

wherein $P_3$ indicates a pixel of an area of the marker in the images; $P_4$ indicates a pixel of an area of the specific developing area; and $S_0$ indicates an actual area of the marker.

* * * * *